US005995697A

United States Patent [19]

Byron et al.

[11] Patent Number: 5,995,697

[45] Date of Patent: Nov. 30, 1999

[54] PARTIALLY COATED GRATING OPTICAL FIBRE, METHOD OF PRODUCING SAME AND FIBRE TELECOMMUNICATIONS SYSTEM

[75] Inventors: Kevin Christopher Byron; Clifford Michael Leggett, both of Bishop Stortford, United Kingdom

[73] Assignee: Northern Telecom Limited, Montreal, Canada

[21] Appl. No.: 08/974,213

[22] Filed: Nov. 19, 1997

[51] Int. Cl.[6] .............................. G02B 6/02; B05D 5/06; C03B 37/023; H04J 14/02

[52] U.S. Cl. ........................... 385/128; 385/37; 385/123; 385/127; 385/141; 427/163.1; 65/385; 359/127; 359/130; 359/161

[58] Field of Search ............................. 385/37, 123, 127, 385/128, 141; 427/163.1; 65/385; 359/127, 130, 161

[56] References Cited

U.S. PATENT DOCUMENTS 5,151,966 9/1992 Brehm et al. .......................... 385/128
5,367,588 11/1994 Hill et al. ................................ 385/37
5,377,292 12/1994 Bartling et al. ........................ 385/128
5,559,907 9/1996 Inniss et al. ......................... 385/37 X
5,633,966 5/1997 Nakaishi .................................. 385/37
5,708,739 1/1998 Patton ...................................... 385/37
5,790,726 8/1998 Ito et al. ................................. 385/37
5,867,618 2/1999 Ito et al. ................................. 385/37

*Primary Examiner*—Brian Healy
*Attorney, Agent, or Firm*—Lee, Mann, Smith, McWilliams, Sweeney & Ohlson

[57] ABSTRACT

A partially coated optical fiber for laser transmission, is described, wherein the partially coated optical fiber comprises an optical fiber which comprises an optionally clad fiber core and an external coating. The external coating and the fiber core are longitudinally substantially coextensive but circumferentially non-coextensive whereby the coating defines a grating window extending longitudinally for at least the major part of the length of the fiber. The window is optionally interrupted by one or more coating continuities which partition said window. The coating has a thickness such that a plane bridging the circumferential displacement of the grating window is extra-peripheral of the optical fiber.

82 Claims, 5 Drawing Sheets

20
22
20
22
20
18
16
14
10

18
16
33
14

30
36
32
34

10
39

31
12
29
28

28

12

PARTIALLY COATED GRATING OPTICAL FIBRE, METHOD OF PRODUCING SAME AND FIBRE TELECOMMUNICATIONS SYSTEM

BACKGROUND OF THE INVENTION

This invention relates to a partially coated optic fibre and in particular to a partially coated optical fibre for laser transmission which may be incorporated into optical devices or telecommunication systems.

Since their inception in the mid-1960's, the growth of the use of optical fibres in optical devices and telecommunication systems has been substantial. This growth has been due largely to the remarkable data carrying capacity displayed by fibres.

However, optical fibres do have a significant draw back, in that they are relatively brittle and fragile. Therefore, optical fibres are commonly provided with a protective coating of a plastics material, commonly a UV curable material such as an acrylate or a UV curable polymide. Desolite 950-106, 950-108, 950-131 and 3471-3-14 are routinely used for coating optical fibres for general purpose uses. Thermally cured silicon coatings, such as Sylgard 180 and 184 are also available. However, when these materials provide a relatively soft and tacky coating which is used in either high temperatures or chemical environments in which acrylate coatings are not suitable.

For practical use in telecommunication systems such fibres may be combined into multi-fibre cables formed, for example, from a polyurethane outer jacket. If additional strengthening is required the jacket may be provided with strengthening members formed, for example, from Kevlar. However, as this application relates to the cladding of individual fibres such multi-fibre cables will not be discussed further herein.

In use fibres tend to be end coupled and end pumped, at least in part because of the requirement to coat the fibres. That is, any useful radiation within the fibre is injected through the end face of the fibre, travels the full length of the fibre through internal reflection, in the normal manner, and is transmitted from the remote end of the fibre.

However, in some situations there are significant advantages to be gained from access to a circumferential portion of the fibre. By far the most important of these is the use of a light source to produce permanent light sensitive changes within the optical fibres. In other words advantages are gained from the use of a light source to produce a periodic refractive index modulation within the fibre in the form of a grating. The most common light source used is a UV laser such as an Eximer or Argon ion laser. Such gratings can be used in a host of devices from sensors and band pass filters to fibre laser mirrors.

Applications which require the removal of the coating over lengths exceeding 50 mm include, for example, fibre grating dispersion equalisers and long period gratings which may be written into the core or cladding for applications which include gain flattening, polarisation rocking and or loss filters, wave length selective polarisers and cladding mode pumped amplifiers. For example, a dispersion equaliser requires up to eight meters in length of coating to be removed from the fibre, which leaves a substantial length of fibre which is open to contamination or physical damage.

In this device a long chirped grating is written into a stripped fibre spanning the 32 nm gain window of an erbium amplifier. Such a device, when connected to the first output port of a three port circulator provides equalisation of dispersed signals transmitted down the fibre. The chirped grating simply removes the wavelength dependent time delay spreading arising from the dispersion in the transmission fibre.

Long period grating applications operate on the basis that a refractive index variation along the length of a fibre has a period that matches the difference in propagation constants for the lowest order mode in the fibre core and some higher order mode in the cladding. This causes power to be transferred from one mode to the other, which can be used to provide wavelength selective loss and polarisation rocking in two moded fibres. In cladding mode pumped amplifiers by writing the index changes in the cladding power can be transferred from the cladding to the core more efficiently than would otherwise be possible.

A further area in which the invention may be useful is in the area of non-intrusive taps wherein a loss mechanism such as microbending can be used to eject light from the length of the fibre. If the coating is removed this light can more easily and efficiently be accessed. Therefore, there is a conflict between the need for access to the fibre and the need for protective coatings.

SUMMARY OF THE INVENTION

It is an object of the present invention to provide an optical fibre with a significant amount of partially stripped yet substantially protected fibre.

It is another object of the present invention to provide a fibre through which access to the core/cladding can be obtained while minimising the possibility of damage to the core/cladding.

It is a further object of the present invention to provide an optical fibre transmission system comprising a fibre with the properties discussed above.

It is yet a further object of the present invention to provide an optical device comprising an optical fibre with the properties discussed above.

According to a first aspect of the present invention there is provided a partially coated optical fibre for laser transmission, the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

Preferably, the circumferential displacement of the window is from about 10% of a quadrant to about 100% of a quadrant.

According to a second aspect of the present invention there is provided a partially coated optical fibre for laser transmission, the partially coated optical fibre comprising:

(i) an optical fibre comprising a doped silica glass core and a silica glass cladding having a lower refractive index than the core;

(ii) a radiation-cured plastics material coating; and (iii) a full coating thickness grating window in the coating, the window being defined by a longitudinal discontinuity in the circumferential extent of the coating, the window optionally being coextensive longitudinally with the optical fibre or being interrupted by one or more coating continuities which partition said window, the depth of the window being such that a plane across its circumferential dimension lies outside the periphery of the silica glass cladding of the optical fibre.

Preferably, the circumferential dimension of the window is from about 10° to about 30°.

According to a third aspect of the present invention three is provided an optical fibre transmission system comprising an assembly of at least first and second optical fibres and an associated optical coupler which couples the first and second optical fibres together, and there being a grating written in at least the first optical fibre, said first optical fibre comprising a partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

Preferably, the window has a circumferential displacement of from about 10% of a quadrant to about 100% of a quadrant.

Preferably, the second optical fibre is a long-haul optical fibre having kilometers order length and the first optical fibre is of meters order length or less.

Preferably, the grating is UV laser-written.

According to a fourth aspect of the present invention there is provided an optical fibre transmission system comprising:

(a) laser pulse transmitter means, (b) an optical transmission line optically coupled to the laser pulse transmitter means, and comprising at least one partially coated optical fibre comprising:

(i) an optical fibre which comprises an optionally clad fibre core, and (ii) an external coating, the external coating and the fibre core being longitudinally substantially coextensive but circumferentially non-coextensive whereby the coating defines an optical output window extending longitudinally for the length of the fibre, the window optionally being interrupted by one or more coating continuities which partition said window, the coating having a thickness such that a plane bridging the circumferential displacement of the window is extra-peripheral of the optical fibre, and (c) laser pulse output receiver means coupled to the surface of the optical fibre exposed in the output window of the partially coated optical fibre for coupling laser power out of the optical fibre.

According to a fifth aspect of the present invention there is provided an optical fibre transmission system comprising:

(a) laser pulse transmitter means, (b) an optical transmission line optically coupled to the laser pulse transmitter means, and comprising at least one partially coated optical fibre comprising:

(i) an optical fibre comprising a doped silica glass core and a silica glass cladding having a lower refractive index than the core, (ii) a radiation-cured plastics material coating, and (iii) a full coating thickness optical output window in the coating, the window being defined by a longitudinal discontinuity in the circumferential extent of the coating, the window being coextensive longitudinally with the optical fibre, the window optionally being interrupted by one or more coating continuities which partition said window, the depth of the window being such that a plane across its circumferential dimension lies outside the periphery of the silica glass cladding of the optical fibre, and (c) laser pulse output receiver means coupled to the surface of the optical fibre exposed in the output window of the partially coated optical fibre for coupling laser power out of the optical fibre.

According to a sixth aspect of the present invention there is provided an optical fibre transmission system comprising:

(a) an optical transmission line comprising at least one partially coated optical fibre comprising:

(i) an optical fibre which comprises an optionally clad fibre core, and (ii) an external coating, the external coating and the fibre core being longitudinally substantially coextensive but circumferentially non-coextensive whereby the coating defines an optical input window extending longitudinally for the length of the fibre, the window optionally being interrupted by one or more coating continuities which partition said window, the coating having a thickness such that a plane bridging the circumferential displacement of the window is extra-peripheral of the optical fibre, (b) laser pulse transmitter means optically coupled to the optical fibre of the transmission line through the optical input window of the partially coated optical fibre for coupling laser power into the optical fibre and (c) laser pulse output receiver means optically coupled to the optical transmission line to receive laser pulse output therefrom.

According to a seventh aspect of the present invention there is provided an optical fibre transmission system comprising:

(a) an optical transmission line comprising at least one partially coated optical fibre comprising:

(i) an optical fibre comprising a doped silica glass core and a silica glass cladding having a lower refractive index than the core, (ii) a radiation-cured plastics material coating, and (iii) a full coating thickness optical input window in the coating, the window being defined by a longitudinal discontinuity in the circumferential extent of the coating, the window being coextensive longitudinally with the optical fibre, the window optionally being interrupted by one or more coating continuities which partition said window, the depth of the window being such that a plane across its circumferential dimension lies outside the periphery of the silica glass cladding of the optical fibre, (b) laser pulse transmitter means optically coupled to the optical fibre of the transmission line through the optical input window of the partially coated optical fibre for coupling laser power into the optical fibre, and (c) laser pulse output receiver means optically coupled to the optical transmission line to receive laser pulse output therefrom.

Preferably, the circumferential dimension of the window is from about 10° to about 30°.

Preferably, the grating window is longitudinally continuous and devoid of interruptions by any coating continuity.

Preferably, the grating window is interrupted over at least part of its length by a plurality of individual coating continuities which partition said fibre into a plurality of ports, each coating continuity having a width in the longitudinal direction of the fibre of from 300 to 500 μm, and there being at least 2 and not more than 10 such coating continuities per meter of so-interrupted fibre length.

Preferably, the optical fibre is made of silica glass.

Most preferably, the optical fibre comprises a silica glass core doped at least with germanium oxide, and silica glass cladding having a lower refractive index than that of the core.

Preferably, the coating is made of a urethane-acrylate copolymer.

Preferably, the grating window has a circumferential displacement of about 10° to about 30°.

Preferably, the grating window has a circumferential displacement of about 15° to about 25°.

Preferably, the coating has a thickness of from about 200 to about 300 μm.

Preferably, the core or cladding of the optical fibre has a dispersion compensation grating written therein.

According to an eighth aspect of the present invention there is provided an optical device comprising a partially coated optical fibre wherein a grating is written, the grating being selected from the group consisting of:

(i) a grating oriented normal to the direction of travel of light to be transmitted along the fibre, the grating acting as a dispersion equalizer; and (ii) a grating oriented non-normally and non-aligned to the direction of travel of light to be transmitted along the fibre, the grating acting as a non-intrusive radiation mode tap;

the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

According to a ninth aspect of the present invention there is provided an optical device comprising a partially coated optical fibre wherein a grating is written, the grating being configured to act as an optical filter and the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

Preferably, the window has a circumferential displacement of from about 10% of a quadrant to about 100% of a quadrant.

Preferably, the optical transmission line comprises:

(i) one or more said partially coated optical fibres each in meters order length or less, and (ii) one or more long-haul optical fibres each having kilometers order length, said long-haul fibres being optically coupled to said partially coated fibres.

Preferably, the optical fibre is selected from the group consisting of polarization filters, wavelength loss filters and gain flattening filters.

According to a tenth aspect of the present invention there is provided an optical device comprising a partially coated optical fibre in combination with a fibre microbending device applied to the fibre, said partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre, said microbending device being applied to said fibre upon the surface thereof which is exposed through the window to microbend the fibre at the location of the microbending device sufficient to reduce total internal reflection within the fibre so that power may be tapped out from the fibre.

According to an eleventh aspect of the present invention there is provided an optical transmission device comprising a partially coated optical fibre, the partially coated optical fibre having an external coating which is longitudinally substantially coextensive with the optical fibre but circumferentially incomplete whereby the coating defines a longitudinal discontinuity forming a window through which the optical fibre is exposed, the window optionally being interrupted by one or more coating continuities which partition said window into ports, the optical fibre having a grating post-written in the optical fibre, the depth and circumferential width of the window being such that a plane across its circumferential dimension lies outside the periphery of the optical fibre.

According to a twelfth aspect of the present invention there is provided an optical fibre telecommunications system comprising a laser pulse signal input device, an optical transmission line which comprises a partially coated optical fibre and which is optically coupled to the laser pulse signal input device, and receiver means for receiving laser pulse signal output from the optical transmission line to enable transduction of the signal carried by the laser pulses, said partially coated optical fibre having a dispersion compensation grating written therein, the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

According to a thirteenth aspect of the present invention there is provided a method of producing a partially coated optical fibre which process comprises coating a fluid radiation-curable uncured precursor of a plastics coating material upon an optical fibre so as to cover the external surface of the fibre completely, curing the coating material over a main portion of the coated fibre surface by irradiating the coating material with curing radiation over said main portion of the coated fibre surface from one or more first radiation sources, said irradiated main portion being a portion extending longitudinally for the length of the fibre but being circumferentially non-coextensive with the fibre, whereby the fibre coating has a discontinuity in its covering of cured plastics material, optionally curing the coating material over further portions of the coated fibre surface by irradiation of said further portions with curing radiation from one or more further radiation sources, said further portions bridging the discontinuity, applying a solvent for the uncured precursor to the non-irradiated areas of the coated fibre surface to remove uncured coating material by dissolution or dispersion, said solvent dissolving or dispersing said uncured coating material at least preferentially relative to the cured plastics coating material, and collecting the resulting partially coated optical fibre, the partially coated optical fibre having a window occupying the location of the removed fibre coating, said window exposing the surface of the optical fibre and being optionally interrupted by a plurality of individual cured coating continuities which partition the window into a plurality of ports, the window and the cured coating thickness being such that a plane bridging the window across its circumferential displacement is extra-peripheral of the optical fibre.

Preferably, the coating is fixed so as to have a circumferential extent of only from about 300% of a quadrant to about 390% of a quadrant.

Preferably, the partially coated optical fibre comprises:

(i) an optical fibre comprising a doped silica glass core and a silica glass cladding having a lower refractive index than the core;

(ii) a radiation-cured plastics material coating; and (iii) a full coating thickness window in the coating, the window being defined by a longitudinal discontinuity in the circumferential extent of the coating, the window being coextensive longitudinally with the optical fibre, the window optionally being interrupted by one or more coating continuities which partition said window, the depth of the window being such that a plane across its circumferential dimension lies outside the periphery of the silica glass cladding of the optical fibre.

Preferably, the circumferential dimension of the window is from about 10° to about 30°.

Preferably, the method includes the step of writing a dispersion compensation grating in the fibre.

Preferably, further portions of the coated surface are irradiated by passing the coated fibre past one said further radiation source and operating said further radiation source by pulsed operation so that said portions are separated according to the pulse frequency of the further radiation source and the velocity of passage of the coated fibre past the further radiation source.

Preferably, the radiation source used to cure the uncured precursor of the plastics coating material is an ultra-violet lamp or laser.

Alternatively, the radiation source used to cure the uncured precursor of the plastics coating material is an infrared lamp or laser.

Preferably, when required the whole circumference of the fibre is irradiated by de-focusing the radiation source such that a portion of the radiation is reflected from a concave mirror placed on the opposite side of the fibre from the radiation source so as to irradiate the otherwise non-irradiated portion of the fibre.

Preferably, a line printer is utilised to print a line of reflective ink longitudinally along the length of the fibre, the grating window being produced by the irradiating light being reflected from said line.

Preferably, the line printer may be controlled to produce a discontinuous line of reflective ink along the length of the fibre so as to enable production of coating continuities in the unprinted areas of the fibre.

Alternatively, after the precursor to the plastics coating material is provided around the full circumference of the fibre a grating window is produced by laser ablation of the precursor to the coating.

Preferably, the radiation source used for laser ablation is an Eximer laser.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
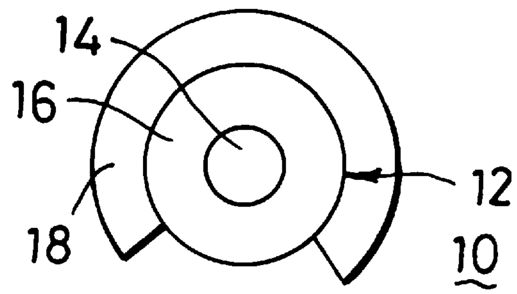
FIG. 1 is a schematic representation of an end of a partially coated optical fibre in accordance with the present invention.
Figure 2A:
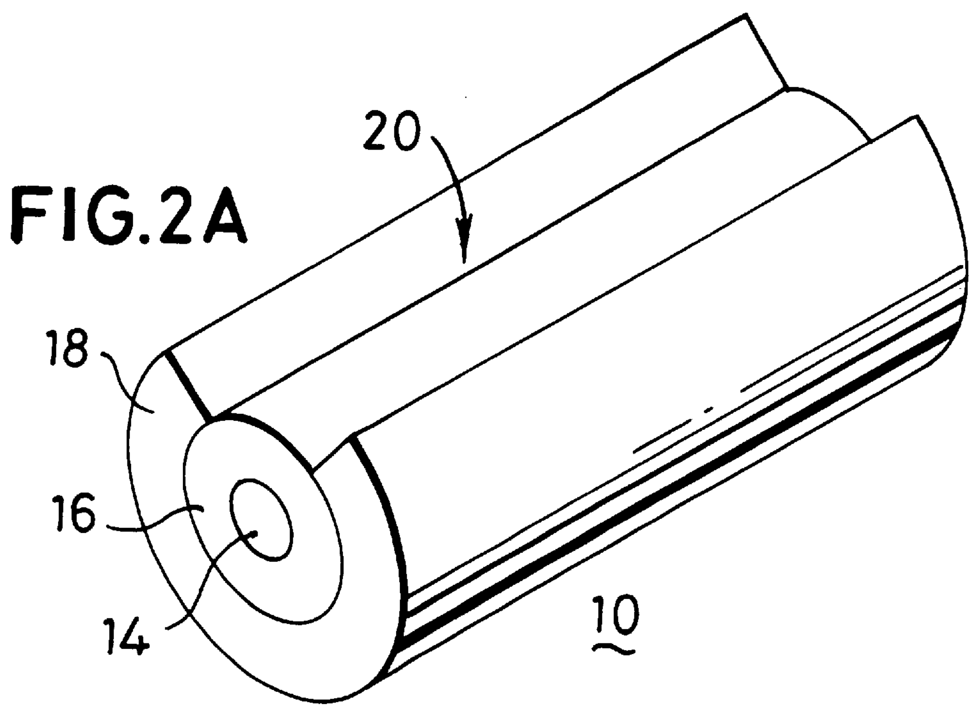
FIG. 2*a* illustrates a fibre in accordance with the present invention having no longitudinal coating continuities.
Figure 2B:
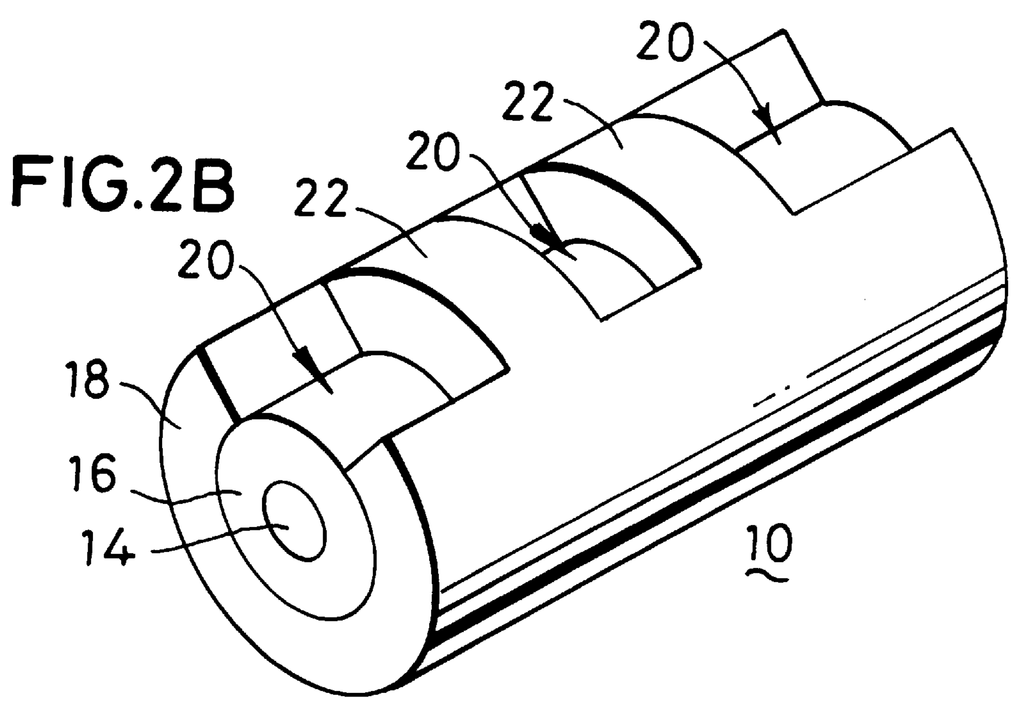
FIG. 2*b* illustrates a fibre in accordance with the present invention having a plurality of circumferential coating continuities.

A partially coated optical fibre, in accordance with the present invention, is illustrated schematically in FIGS. 1 and 2 and is referenced generally with the reference numeral 10. The partially coated optical fibre comprises an optical fibre 12 which in turn comprises a fibre core 14 and an optional cladding 16. The partially coated optical fibre 10 further comprises an external coating 18. The external coating 18 and the optical fibre 12 are longitudinal substantially coextensive but circumferentially non-coextensive. The coating defines a grating window 20 extending longitudinally for at least the major part of the length of the fibre 10. The grating window 20 has a circumferential displacement of about 10% of a quadrant to about 100% of a quadrant, in practice. The window is interrupted by a plurality of coating continuities 22 (FIG. 2*b*) wherein the coating 18 extends around the full circumference of the optical fibre 12.

The coating has a thickness such that a plane 24 bridging the circumferential displacement of the grating window 20 is extra-peripheral of the optical fibre 12. Thus, the partially coated optical fibre 10 provides protection for the optical fibre 12. For example, when the partially coated optical fibre 10 is wound onto a drum 26 (FIG. 3) the core of the drum will remain extra-peripheral of the optical fibre 12 and will not therefore damage the optical fibre 12. Also, the relatively small gating window substantially prevents contamination of the fibre by impurities.

However, the partially coated optical fibre 10 provides access via the grating window 20 for writing a grating 28 (FIG. 8) onto the optical fibre 12.

The optical fibre is formed from Silica glass, the Silica glass core 14 being doped with Germanium Oxide and the Silica glass cladding 16 having no dopant. Therefore, the core will have a higher refractive index than the cladding as required to provide total internal refraction of light within the fibre 12.

The coating of the partially coated fibre 10 in FIGS. 1 and 2 is made from Urethane-acrylate copolymer. However, any suitable UV or IR curable plastics material commonly used for or with the properties required by fibre coatings can be utilised in a fibre in accordance with the present invention.

Although it may not be obvious from the Figures, it should be noted that the grating window 20 has a circumferential displacement of about 10 to 30° with a preferable displacement of about 15 to 25°, the displacement in the FIG. 1 embodiment being approximately 20°. The fibre core cladding and coating thicknesses will be determined dependent upon the use to which the partially coated optical fibre 10 is to be put, in accordance with normal fibre manufacturing processes. However the coating thickness will tend to be between 200 and 300 microns and will be chosen so as to ensure that the plane bridging the circumferential displacement of the grating window 20 is extra-peripheral of the optical fibre 12 for all grating window proportions, as hereinbefore described, while ensuring that the fibre is largely within normal fibre dimensions.

As discussed above, the partially coated optical fibre 10 may have one or more coating continuities. FIG. 2*a* illustrates an optical fibre in accordance with the present invention in which the grating window 20 is longitudinally continuous and devoid of interruption by any coating continuities. Alternatively, FIG. 2*b* illustrates a partially coated optical fibre 10, in accordance with the present invention, wherein the grating window 20 is interrupted over part of its length by a plurality of individual coating continuities 22 which partition the fibre into a plurality of ports. In this embodiment each coating continuity has a width in the longitudinal direction of the fibre of from 300 to 500 microns. In practice there will be at least two and not more than ten such continuities per meter of so-interrupted fibre length.

Figure 3:
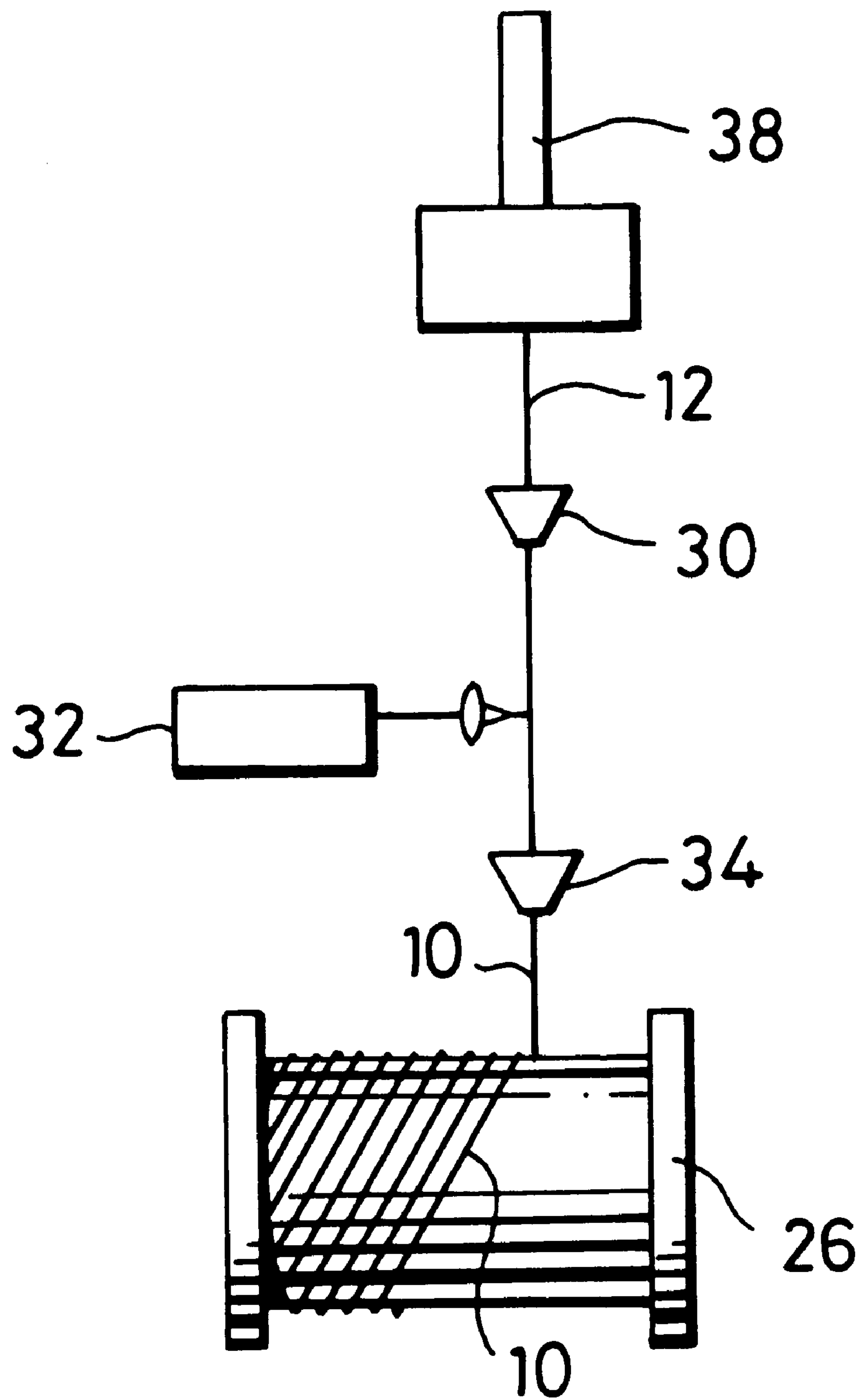
FIG. 3 is a schematic representation of an in line process which may be utilised to produce the partially coated optical fibre of FIGS. 1 and 2.

FIG. 3 illustrates an apparatus for producing a partially coated optical fibre 10, as described above, including apparatus 30 for coating a fluid radiation-curable uncured precursor of a plastics coating material 18 upon an optical fibre so as to cover the external surface of the fibre 12 completely, in the normal manner. Thereafter the coating material is cured over a main portion of the coated fibre surface by radiating the coating material with curing radiation, for example, from a UV lamp or laser 32. The radiated main portion of the fibre is a portion extending longitudinally over the length of the fibre but having a circumferential extent of only from about 300% of a quadrant to about 390% of a quadrant. Thus, the fibre coating has a discontinuity in its covering of cured plastics material, as discussed above.

In addition, optionally the apparatus 32 may include means for curing the coating material over further portions of the coated fibre surface by irradiating said further portions with curing radiation from one or more further radiation sources, said further portions bridging the discontinuity.

Figure 5:
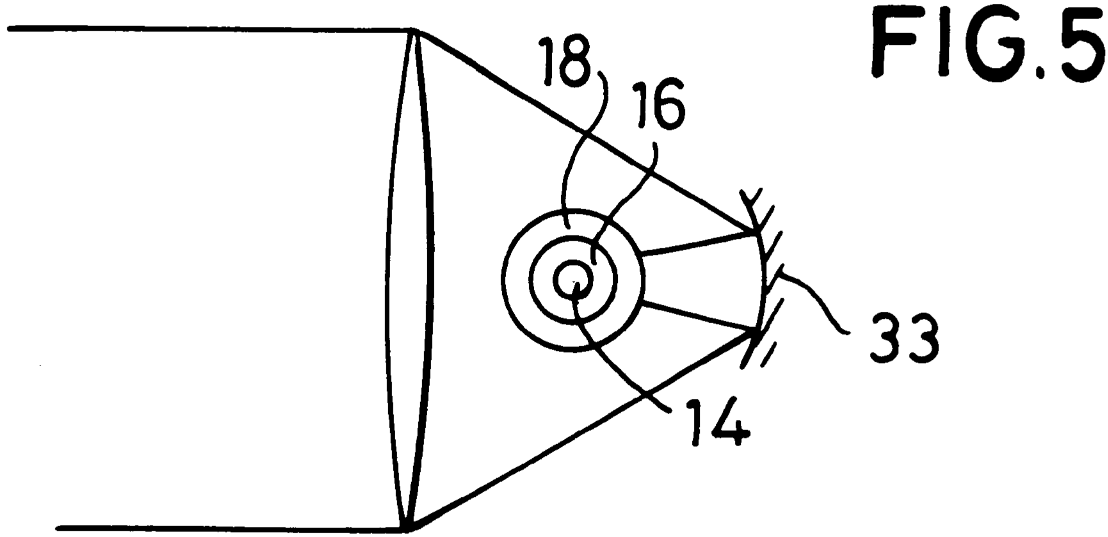
FIG. 5 is an enlarged schematic representation of the apparatus of FIG. 4, arranged to cure both sides of the fibre.

These additional sources of radiation may include a separate additional UV lamp or laser or more likely a means of refocusing the presently available radiation onto the fibre around its entire circumference (FIG. 5). These means may include de-focusing the laser and using a concave mirror 33 on the opposite side of the fibre to the laser source so as to reflect light onto the otherwise non-irradiated area of the fibre, as illustrated schematically in FIG. 5.

Thereafter, the fibre is passed through an organic solvent bath 34 so as to remove the uncured coating material by dissolution or dispersion. The resulting partly coated optical fibre is then collected on a drum 26.

Figure 4:
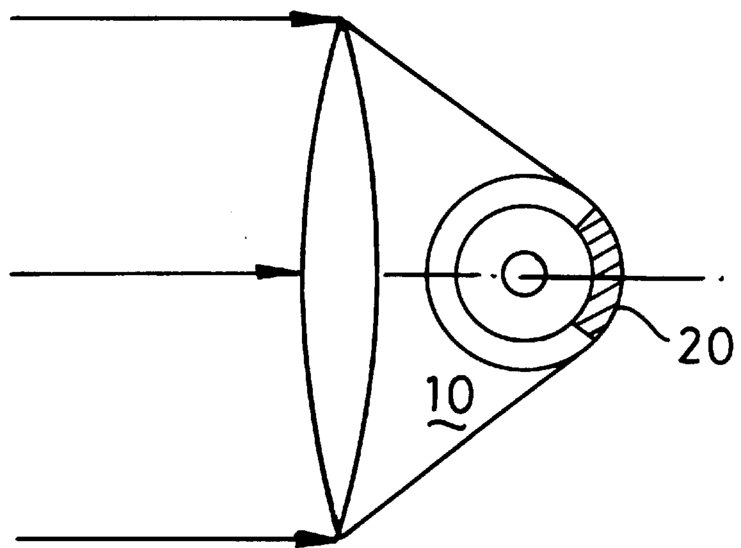
FIG. 4 is an enlarged schematic representation of the apparatus utilised in the UV light curing of the coating of the partially coated optical fibre in FIG. 3.

With reference to FIG. 3, the fibre 12 is produced from a pre-form 38 by pulling in a normal fashion and the uncured pre-former of the plastics coating is applied by pulling the fibre through the coating bath 30, in a known manner. Therefore, the UV lamp or laser 32 is focused onto the fibre 10. As can be seen in FIG. 4 if the UV lamp is focused such that a portion of the fibre is "left in shadow" and is not directly irradiated by the UV light source then this portion of the fibre will remain uncured. 35 $KJm^{-2}$ of UV radiation at 250 or 335 nm is focused on to the coating to cure the coating during the manufacturing process, using a doped Mercury lamp which has been optimised for the purpose. The base coating material is strongly absorbing to UV radiation below 300 nm and the coating gels at a small percentage of the energy required to achieve full cure. Therefore, the 250 nm radiation can only be used to achieve a tack free surface.

If an alternate pre-former to the coating material is used then infrared radiation may be used to thermally cure the fibre instead of the UV light used to optically cure the fibre illustrated in FIG. 4. A diagram of this arrangement is not included as the arrangement will be largely the same as that of FIG. 4, the only difference being the replacement of the UV light source with an infrared source. Alternatively, a simple heater may be used if some way of masking part of the fibre is used, as discussed below.

Figure 6:
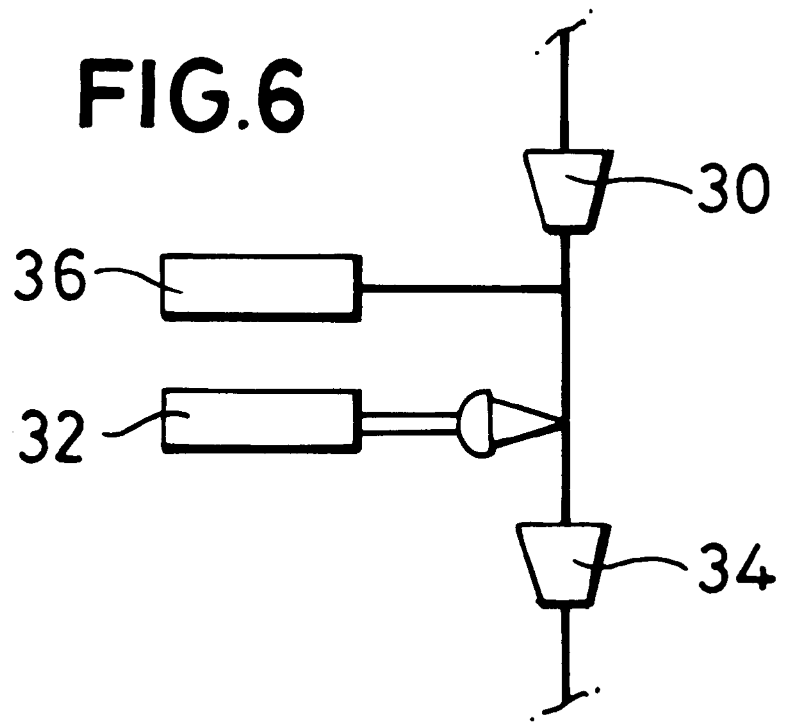
FIG. 6 is an enlarged schematic representation of an apparatus utilised in the apparatus of FIG. 3 when line printing is utilised in the curing process.

FIG. 6 illustrates a further method of forming the grating window in the fibre, in which a mask in the form of a line, of the desired width, is printed on the fluid precursor to the coating material by a line printer 36 prior to illumination. If a UV lamp is arranged to irradiate the entire circumference of the fibre and if the mask is printed in a UV reflecting material then only the unprinted areas of the precursor to the coating material will be cured. The same applies if an IR source and IR reflective ink is used.

Figure 7:
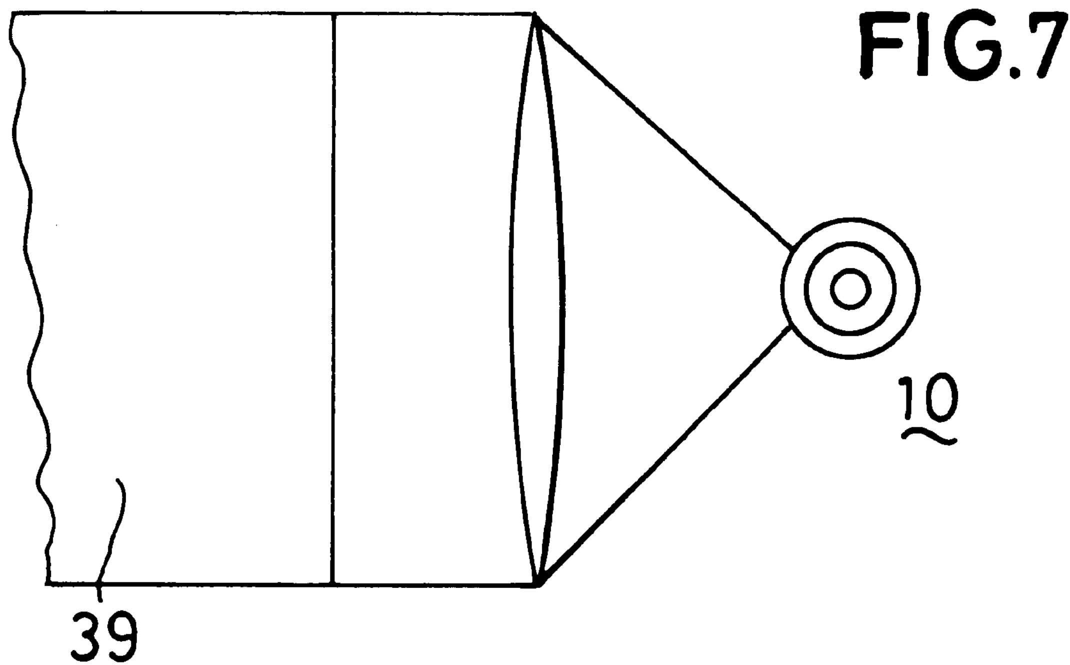
FIG. 7 is an enlarged schematic representation of an apparatus usable in the apparatus of FIG. 3 when laser ablation is utilised in order to strip a portion of the partially coated optical fibre.

FIG. 7 illustrates a further method of producing a partially coated optical fibre in accordance with the present invention wherein laser ablation using a high power Eximer laser 39 is utilised to strip a portion of the uncured precursor to the coating material by focusing the Eximer laser light on to the fibre. The Eximer laser radiation is modulated at 1 Hz and is focused onto the fibre producing 1.8 $Jcm^{-2}$ in order to ablate the fluid fibre coating. This may be enhanced by using a printing method in accordance with FIG. 6 but using an absorbing print ink so that the majority of the light incident on the fibre is absorbed.

Either of the methods utilising a mask may be preferable when producing a partially coated optical fibre having a plurality of coating continuities as these can be arranged by appropriate printing of the mask prior to illumination by the curing radiation or the laser ablating radiation.

Figure 8A:
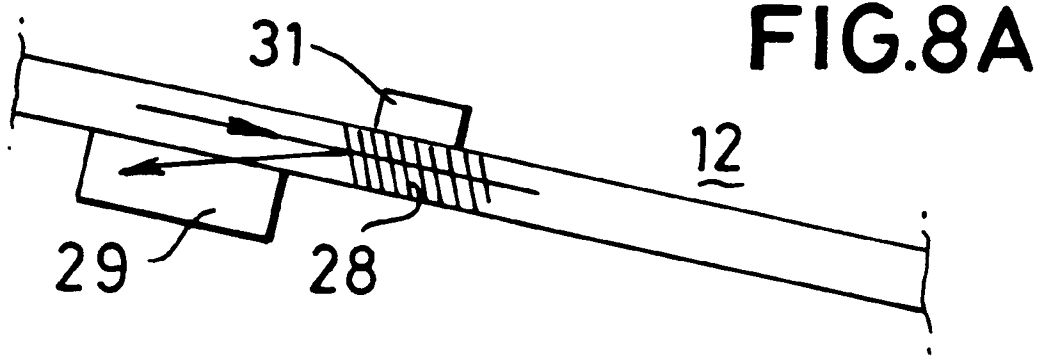
FIG. 8*a* illustrates the use of the fibre of FIGS. 1 and 2 in a non-intrusive optical tap.

FIG. 8*a* illustrates a fibre with a grating 28 oriented non-normally and non-aligned to the direction of travel of light to be transmitted along the fibre, thus allowing the grating to act as a non-intrusive radiation mode tap, with a percentage of the light transmitted along the fibre being refracted out of the fibre by the grating. Both of these devices may be utilised in a telecommunications system as discussed in FIG. 10. A laser pulse output receiver means 29 may be coupled to the surface of the optical fibre exposed in the output window of the partially coated optical fibre for coupling laser power out of the optical fibre. A microbending device 31 may also be applied to the fibre in order to vary the percentage of incident light tapped from the fibre via the non-intrusive (grating 28) tap. One or more of said gratings 28 may be written into a single fibre. The microbending device and/or the laser pulse output receiver means may also be used in the optical fibre transmission system of FIG. 9 or the telecommunications system of FIG. 10.

Figure 8B:
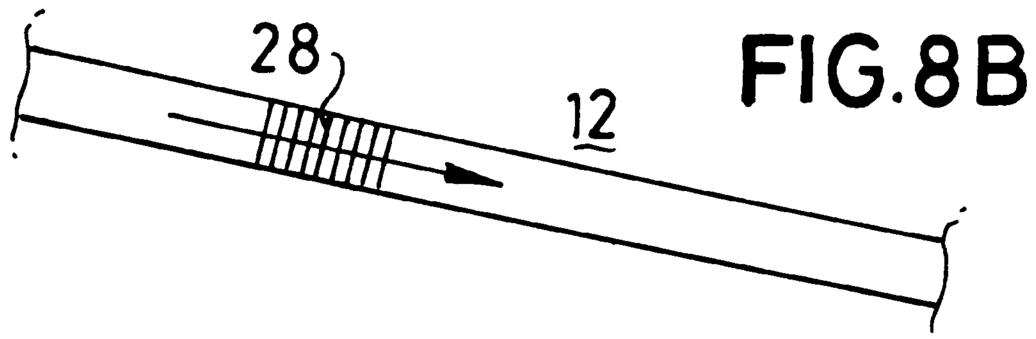
FIG. 8*b* illustrates the use of the fibre of FIGS. 1 and 2 in a dispersion equalising device.

FIG. 8*b* illustrates a fibre as described above wherein a grating 28 is written into the fibre utilising UV radiation such that the grating is oriented normal to the direction of travel of the light to be transmitted along the fibre thus enabling the grating to act as a dispersion equaliser, as discussed above.

Figure 9:
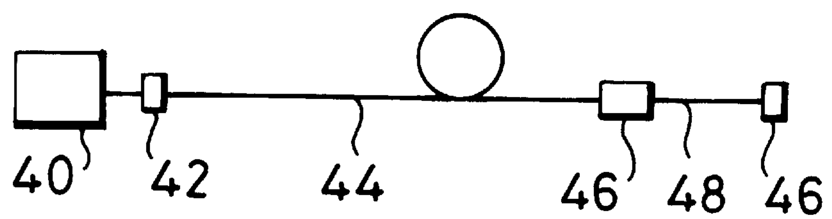
FIG. 9 illustrates the use of the fibre of FIGS. 1 and 2 in an optical transmission system.

FIG. 9 illustrates an optical fibre transmission system having a laser source 40 coupled through a coupler 42 to approximately a kilometer length of fully coated optical fibre 44. The optical fibre is then coupled through a coupler 46 to a length of partially coated optical fibre 48, as described above. In this transmission system radiation may be injected into the kilometer length optical fibre in the normal manner. Any dispersion within the fibre can be compensated for if the partially coated optical fibre 48 includes a dispersion equalising grating. In addition, the fibre 48 may include another form of grating to provide a further service such as that of a non-intrusive tap. A further length of fibre may be connected after the partially coated optical fibre 48. Also, in some embodiments the partially coated optical fibre 48 may be placed between the laser source 40 and the kilometer length of coated fibre 44. The partially coated optical fibre is normally produced in lengths of less than 1 meter.

Figure 10:
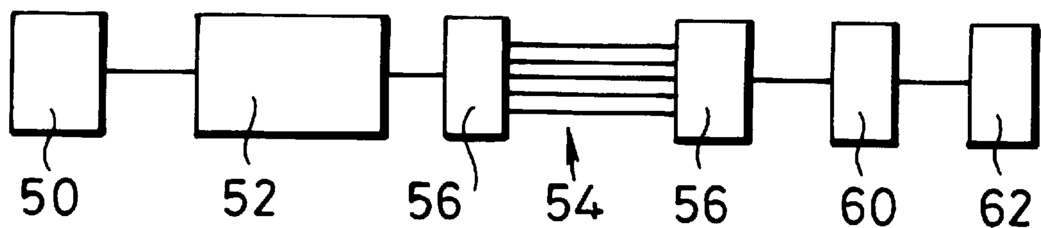
FIG. 10 illustrates the use of the optical fibre of FIGS. 1 and 2 in an optical telecommunications system.

FIG. 10 illustrates an optical fibre telecommunications system including a signal generating means 50 coupled to a laser source 52 which produces radiation in the near infrared low loss window for silica fibres which is injected into a one of a plurality of transmission lines 54 through a multiplexor 56, in a normal fashion. One or more of the transmission lines 54 includes a length of partially coated optical fibre as described above. These fibres are coupled to a demultiplexor 58 and from there to a receiver including an optical/electrical converter 60 from where an electrical signal is transmitted to a final receiver 62. As above, the use of the partially coated optical fibre including a grating enables either dispersion compensation, non-intrusive tapping or any of the other functions discussed above.

Modifications may be incorporated without departing from the scope of the present invention. In particular, slight variations in the dimensions of the grating window may be included without departing from the scope of the invention as claimed and different light sources may be used to cure the coating.

We claim:

1. A partially coated optical fibre for transmission, the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

2. A partially coated optical fibre as claimed in claim 1, wherein the window has a circumferential displacement of from about 10% of a quadrant to about 100% of a quadrant.

3. A partially coated optical fibre as claimed in claim 1, wherein the grating window is longitudinally continuous and devoid of interruptions by any coating continuity.

4. A partially coated optical fibre as claimed in claim 1, wherein the grating window is interrupted over at least part of its length by a plurality of individual coating continuities which partition said fibre into a plurality of ports, each coating continuity having a width in the longitudinal direction of the fibre of from 300 to 500 $\mu$m, and there being at least 2 and not more than 10 such coating continuities per meter of so-interrupted fibre length.

5. A partially coated optical fibre as claimed in claim 1, wherein the optical fibre is made of silica glass.

6. A partially coated optical fibre as claimed in claim 5, wherein the optical fibre comprises a silica glass core doped at least with germanium oxide, and silica glass cladding having a lower refractive index than that of the core.

7. A partially coated optical fibre as claimed in claim 1, wherein the coating is made of a urethane-acrylate copolymer.

8. A partially coated optical fibre as claimed in claim 1, wherein the grating window has a circumferential displacement of about 10° to about 30°.

9. A partially coated optical fibre as claimed in claim 8, wherein the grating window has a circumferential displacement of about 15° to about 25°.

10. A partially coated optical fibre as claimed in claim 1, wherein the coating has a thickness of from about 200 to about 300 $\mu$m.

11. A partially coated optical fibre as claimed in claim 1, wherein the core or cladding of the optical fibre has a dispersion compensation grating written therein.

12. A partially coated optical fibre for laser transmission, the partially coated optical fibre comprising:

(i) an optical fibre comprising a doped silica glass core and a silica glass cladding having a lower refractive index than the core;

(ii) a radiation-cured plastics material coating; and (iii) a full coating thickness grating window in the coating, the window being defined by a longitudinal discontinuity in the circumferential extent of the coating, the window optionally being coextensive longitudinally with the optical fibre or being interrupted by one or more coating continuities which partition said window, the depth of the window being such that a plane across its circumferential dimension lies outside the periphery of the silica glass cladding of the optical fibre.

13. A partially coated optical fibre as claimed in claim 12, wherein the circumferential dimension of the window is from about 10° to about 30°.

14. Partially coated optical fibre as claimed in claim 12, wherein the grating window is longitudinally continuous and devoid of interruptions by any coating continuity.

15. Partially coated optical fibre as claimed in claim 12, wherein the grating window is interrupted over at least part of its length by a plurality of individual coating continuities which partition said fibre into a plurality of ports, each coating continuity having a width in the longitudinal direction of the fibre of from 300 to 500 μm, and there being at least 2 and not more than 10 such coating continuities per meter of so-interrupted fibre length.

16. Partially coated optical fibre as claimed in claim 12, wherein the silica glass core of the optical fibre is doped at least with germanium oxide.

17. Partially coated optical fibre as claimed in claim 16, wherein the coating is made of a urethane-acrylate copolymer.

18. Partially coated optical fibre as claimed in claim 16, wherein the grating window has a circumferential displacement of about 15° to about 25°.

19. Partially coated optical fibre as claimed in claim 16, wherein the coating has a thickness of from about 200 to about 300 μm.

20. Partially coated optical fibre as claimed in claim 12, wherein the core or cladding of the optical fibre has a dispersion compensation grating written therein.

21. An optical fibre transmission system comprising an assembly of at least first and second optical fibres and an associated optical coupler which couples the first and second optical fibres together, and there being a grating written in at least the first optical fibre, said first optical fibre comprising a partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

22. An optical fibre transmission system as claimed in claim 21, wherein the window has a circumferential displacement of from about 10% of a quadrant to about 100% of a quadrant.

23. An optical fibre transmission system as claimed in claim 21, wherein the second optical fibre is a long-haul optical fibre having kilometers order length and the first optical fibre is of meters order length or less.

24. An optical fibre transmission system as claimed in claim 21, wherein the grating is UV laser-written.

25. An optical fibre transmission system comprising:

(a) laser pulse transmitter means, (b) an optical transmission line optically coupled to the laser pulse transmitter means, and comprising at least one partially coated optical fibre comprising:

(i) an optical fibre which comprises an optionally clad fibre core, and (ii) an external coating, the external coating and the fibre core being longitudinally substantially coextensive but circumferentially non-coextensive whereby the coating defines an optical output window extending longitudinally for the length of the fibre, the window optionally being interrupted by one or more coating continuities which partition said window, the coating having a thickness such that a plane bridging the circumferential displacement of the window is extra-peripheral of the optical fibre, and (c) laser pulse output receiver means coupled to the surface of the optical fibre exposed in the output window of the partially coated optical fibre for coupling laser power out of the optical fibre.

26. An optical fibre transmission system as claimed in claim 25, wherein the window has a circumferential displacement of from about 10% of a quadrant to about 100% of a quadrant.

27. An optical fibre transmission system as claimed in claim 25, wherein the optical transmission line comprises:

(i) one or more said partially coated optical fibres each in meters order length or less, and (ii) one or more long-haul optical fibres each having kilometers order length, said long-haul fibres being optically coupled to said partially coated fibres.

28. A system as claimed in claim 25, wherein the optical fibre of the partially coated optical fibre is made of silica glass.

29. A system as claimed in claim 28, wherein the optical fibre of the partially coated optical fibre comprises a silica glass core doped at least with germanium oxide, and silica glass cladding having a lower refractive index than that of the core.

30. A system as claimed in claim 27, wherein the coating of the partially coated optical fibre is made of a urethane-acrylate copolymer.

31. A system as claimed in claim 27, wherein the window of the partially coated optical fibre has a circumferential displacement of about 10° to about 30°.

32. A system as claimed in claim 31, wherein the window of the partially coated optical fibre has a circumferential displacement of about 15° to about 25°.

33. A system as claimed in claim 27, wherein the coating of the partially coated optical fibre has a thickness of from about 200 to about 300 μm.

34. An optical fibre transmission system comprising:

(a) laser pulse transmitter means, (b) an optical transmission line optically coupled to the laser pulse transmitter means, and comprising at least one partially coated optical fibre comprising:

(i) an optical fibre comprising a doped silica glass core and a silica glass cladding having a lower refractive index than the core, (ii) a radiation-cured plastics material coating, and (iii) a full coating thickness optical output window in the coating, the window being defined by a longitudinal discontinuity in the circumferential extent of the coating, the window being coextensive longitudinally with the optical fibre, the window optionally being interrupted by one or more coating continuities which partition said window, the depth of the window being such that a plane across its circumferential dimension lies outside the periphery of the silica glass cladding of the optical fibre, and (c) laser pulse output receiver means coupled to the surface of the optical fibre exposed in the output window of the partially coated optical fibre for coupling laser power out of the optical fibre.

35. An optical fibre transmission system as claimed in claim 34, wherein, the circumferential dimension of the window is from about 10° to about 30°.

36. A system as claimed in claim 34, wherein the silica glass core of the partially coated optical fibre is doped at least with germanium oxide.

37. A system as claimed in claim 36, wherein the coating of the partially coated optical fibre is made of a urethane-acrylate copolymer.

38. A system as claimed in claim 36, wherein the window of the partially coated optical fibre has a circumferential displacement of about 15° to about 25°.

39. A system as claimed in claim 36, wherein the coating of the partially coated optical fibre has a thickness of from about 200 to about 300 $\mu$m.

40. An optical fibre transmission system as claimed in claim 34, wherein the optical transmission line comprises:

(i) one or more said partially coated optical fibres each in meters order length or less, and (ii) one or more long-haul optical fibres each having kilometers order length, said long-haul fibres being optically coupled to said partially coated fibres.

41. An optical fibre transmission system comprising:

(a) an optical transmission line comprising at least one partially coated optical fibre comprising:

(i) an optical fibre which comprises an optionally clad fibre core, and (ii) an external coating, the external coating and the fibre core being longitudinally substantially coextensive but circumferentially non-coextensive whereby the coating defines an optical input window extending longitudinally for the length of the fibre, the window optionally being interrupted by one or more coating continuities which partition said window, the coating having a thickness such that a plane bridging the circumferential displacement of the window is extra-peripheral of the optical fibre, (b) laser pulse transmitter means optically coupled to the optical fibre of the transmission line through the optical input window of the partially coated optical fibre for coupling laser power into the optical fibre and (c) laser pulse output receiver means optically coupled to the optical transmission line to receive laser pulse output therefrom.

42. An optical fibre transmission system as claimed in claim 41, wherein the window has a circumferential displacement of from about 10% of a quadrant to about 100% of a quadrant.

43. A system as claimed in claim 41, wherein the optical fibre of the partially coated optical fibre is made of silica glass.

44. A system as claimed in claim 43, wherein the optical fibre of the partially coated optical fibre comprises a silica glass core doped at least with germanium oxide, and silica glass cladding having a lower refractive index than that of the core.

45. A system as claimed in claim 41, wherein the coating of the partially coated optical fibre is made of a urethane-acrylate copolymer.

46. A system as claimed in claim 41, wherein the window of the partially coated optical fibre has a circumferential displacement of about 10° to about 30°.

47. A system as claimed in claim 46, wherein the window of the partially coated optical fibre has a circumferential displacement of about 15° to 25°.

48. A system as claimed in claim 41, wherein the coating of the partially coated optical fibre has a thickness of from 200 to 300 $\mu$m.

49. An optical fibre transmission system as claimed in claim 41, wherein the optical transmission line comprises:

(i) one or more said partially coated optical fibres each in meters order length or less, and (ii) one or more long-haul optical fibres each having kilometers order length, said long-haul fibres being optically coupled to said partially coated fibres.

50. An optical fibre transmission system comprising:

(a) an optical transmission line comprising at least one partially coated optical fibre comprising:

(i) an optical fibre comprising a doped silica glass core and a silica glass cladding having a lower refractive index than the core, (ii) a radiation-cured plastics material coating, and (iii) a full coating thickness optical input window in the coating, the window being defined by a longitudinal discontinuity in the circumferential extent of the coating, the window being coextensive longitudinally with the optical fibre, the window optionally being interrupted by one or more coating continuities which partition said window, the depth of the window being such that a plane across its circumferential dimension lies outside the periphery of the silica glass cladding of the optical fibre, (b) laser pulse transmitter means optically coupled to the optical fibre of the transmission line through the optical input window of the partially coated optical fibre for coupling laser power into the optical fibre, and (c) laser pulse output receiver means optically coupled to the optical transmission line to receive laser pulse output therefrom.

51. An optical fibre transmission system as claimed in claim 50, wherein, the circumferential dimension of the window is from about 10° to about 30°.

52. A system as claimed in claim 51, wherein the silica glass core of the optical fibre of the partially coated optical fibre is doped at least with germanium oxide.

53. A system as claimed in claim 51, wherein the coating of the partially coated optical fibre is made of a urethane-acrylate copolymer.

54. A system as claimed in claim 51, wherein the window of the partially coated optical fibre has a circumferential displacement of about 15° to 25°.

55. A system as claimed in claim 51, wherein the coating of the partially coated optical fibre has a thickness of from 200 to 300 $\mu$m.

56. A system as claimed in claim 50, wherein the laser pulse transmitter means is part of a telephone system.

57. An optical fibre transmission system as claimed in claim 50, wherein the optical transmission line comprises:

(i) one or more said partially coated optical fibres each in meters order length or less, and (ii) one or more long-haul optical fibres each having kilometers order length, said long-haul fibres being optically coupled to said partially coated fibres.

58. An optical device comprising a partially coated optical fibre wherein a grating is written, the grating being selected from the group consisting of:

(i) a grating oriented normal to the direction of travel of light to be transmitted along the fibre, the grating acting as a dispersion equalizer; and (ii) a grating oriented non-normally and non-aligned to the direction of travel of light to be transmitted along the fibre, the grating acting as a non-intrusive radiation mode tap;

the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

59. An optical device as claimed in claim 58, wherein the window has a circumferential displacement of from about 10% of a quadrant to about 100% of a quadrant.

60. An optical device comprising a partially coated optical fibre wherein a grating is written, the grating being configured to act as an optical filter and the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

61. An optical device as claimed in claim 60, wherein the window has a circumferential displacement of from about 10% of a quadrant to about 100% of a quadrant.

62. An optical device as claimed in claim 61, wherein the optical filter is selected from the group consisting of polarization filters, wavelength loss filters and gain flattening filters.

63. An optical device comprising a partially coated optical fibre in combination with a fibre microbending device applied to the fibre, said partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre, said microbending device being applied to said fibre upon the surface thereof which is exposed through the window to microbend the fibre at the location of the microbending device sufficient to reduce total internal reflection within the fibre so that power may be tapped out from the fibre.

64. An optical device as claimed in claim 63, wherein the window has a circumferential displacement of from about 10% of a quadrant to about 100% of a quadrant.

65. An optical device comprising a partially coated optical fibre, the partially coated optical fibre having an external coating which is longitudinally substantially coextensive with the optical fibre but circumferentially incomplete whereby the coating defines a longitudinal discontinuity forming a window through which the optical fibre is exposed, the window optionally being interrupted by one or more coating continuities which partition said window into ports, the optical fibre having a grating post-written in the optical fibre, the depth and circumferential width of the window being such that a plane across its circumferential dimension lies outside the periphery of the optical fibre.

66. An optical fibre telecommunications system comprising a laser pulse signal input device, an optical transmission line which comprises a partially coated optical fibre and which is optically coupled to the laser pulse signal input device, and receiver means for receiving laser pulse signal output from the optical transmission line to enable transduction of the signal carried by the laser pulses, said partially coated optical fibre having a dispersion compensation grating written therein, the partially coated optical fibre comprising:

(i) an optical fibre which comprises an optionally clad fibre core; and (ii) an external coating;

the external coating and the fibre core being longitudinally substantially coextensive but circumferentially non-coextensive whereby the coating defines a grating window extending longitudinally for at least the major part of the length of the fibre, the window optionally being interrupted by one or more coating continuities which partition said window, the coating having a thickness such that a plane bridging the circumferential displacement of the grating window is extra-peripheral of the optical fibre.

67. An optical fibre transmission system as claimed in claim 66, wherein the window has a circumferential displacement of from about 10% of a quadrant to about 100% of a quadrant.

68. An optical fibre transmission system as claimed in claim 66, wherein the grating of the partially coated optical fibre is UV laser-written.

69. An optical fibre telecommunications system as claimed in claim 66, wherein the optical transmission line comprises:

(i) one or more said partially coated optical fibres each in meters order length or less, and (ii) one or more long-haul optical fibres each having kilometers order length, said long-haul fibres being optically coupled to said partially coated fibres.

70. A method of producing a partially coated optical fibre which process comprises coating a fluid radiation-curable uncured precursor of a plastics coating material upon an optical fibre so as to cover the external surface of the fibre completely, curing the coating material over a main portion of the coated fibre surface by irradiating the coating material with curing radiation over said main portion of the coated fibre surface from one or more first radiation sources, said irradiated main portion being a portion extending longitudinally for the length of the fibre but being circumferential non-coextensive with the fibre, whereby the fibre coating has a discontinuity in its covering of cured plastics material, optionally curing the coating material over further portions of the coated fibre surface by irradiation of said further portions with curing radiation from one or more further radiation sources, said further portions bridging the discontinuity, applying a solvent for the uncured precursor to the non-irradiated areas of the coated fibre surface to remove uncured coating material by dissolution or dispersion, said solvent dissolving or dispersing said uncured coating material at least preferentially relative to the cured plastics coating material, and collecting the resulting partially coated optical fibre, the partially coated optical fibre having a window occupying the location of the removed fibre coating, said window exposing the surface of the optical fibre and being optionally interrupted by a plurality of individual cured coating continuities which partition the window into a plurality of ports, the window and the cured coating thickness being such that a plane bridging the window across its circumferential displacement is extra-peripheral of the optical fibre.

71. A method as claimed in claim 70, wherein the coating is fixed so as to have a circumferential extent of only from about 300% of a quadrant to about 390% of a quadrant.

72. A method as claimed in claim 70, wherein the partially coated optical fibre comprises:

(i) an optical fibre comprising a doped silica glass core and a silica glass cladding having a lower refractive index than the core;

(ii) a radiation-cured plastics material coating; and (iii) a full coating thickness window in the coating, the window being defined by a longitudinal discontinuity in the circumferential extent of the coating, the window being coextensive longitudinally with the optical fibre, the window optionally being interrupted by one or more coating continuities which partition said window, the depth of the window being such that a plane across its circumferential dimension lies outside the periphery of the silica glass cladding of the optical fibre.

73. A partially coated optical fibre as claimed in claim 72, wherein the circumferential dimension of the window is from about 10° to about 30°.

74. A method as claimed in claim 70, which includes the step of writing a dispersion compensation grating in the fibre.

75. A method as claimed in claim 70, wherein the further portions of the coated surface are irradiated by passing the coated fibre past one said further radiation source and operating said further radiation source by pulsed operation so that said portions are separated according to the pulse frequency of the further radiation source and the velocity of passage of the coated fibre past the further radiation source.

76. A method as claimed in claim 70, wherein the radiation source used to cure the uncured precursor of the plastics coating material is an ultra-violet lamp or laser.

77. A method as claimed in claim 70, wherein the radiation source used to cure the uncured precursor of the plastics coating material is an infrared lamp or laser.

78. A method as claimed in claim 70, wherein when required the whole circumference of the fibre is irradiated by de-focusing the radiation source such that a portion of the radiation is reflected from a concave mirror placed on the opposite side of the fibre from the radiation source so as to irradiate the otherwise non-irradiated portion of the fibre.

79. A method as claimed in claim 78, wherein a line printer is utilised to print a line of reflective ink longitudinally along the length of the fibre, the grating window being produced by the irradiating light being reflected from said line.

80. A method as claimed in claim 79, wherein the line printer is controlled to produce a discontinuous line of reflective ink along the length of the fibre so as to enable production of coating continuities in the unprinted areas of the fibre.

81. A method as claimed in claim 70, wherein after the precursor to the plastics coating material is provided around the full circumference of the fibre a grating window is produced by laser ablation of the precursor to the coating.

82. A method as claimed in claim 81, wherein the radiation source used for laser ablation is an Eximer laser.

* * * * *